United States Patent [19]

N'Guyen et al.

[11] 4,079,448

[45] Mar. 14, 1978

[54] APPARATUS FOR SYNCHRONIZING TASKS ON PERIPHERAL DEVICES

[75] Inventors: Ngoc Luyen N'Guyen; Tuong Duc Luu; Jean Maurice Finet, all of Paris, France

[73] Assignee: Compagnie Honeywell Bull, Paris, France

[21] Appl. No.: 566,025

[22] Filed: Apr. 7, 1975

[51] Int. Cl.² .......................... G06F 3/04; G06F 9/18
[52] U.S. Cl. ................................................. 364/200
[58] Field of Search .................. 445/1; 340/172.5; 364/200 MS, 900 MS

[56] References Cited

U.S. PATENT DOCUMENTS

| | | | |
|---|---|---|---|
| 3,483,522 | 12/1969 | Figueroa et al. | 340/172.5 |
| 3,593,300 | 7/1971 | Driscoll et al. | 340/172.5 |
| 3,665,415 | 5/1972 | Beard et al. | 340/172.5 |
| 3,825,902 | 7/1974 | Brown et al. | 340/172.5 |
| 3,848,233 | 11/1974 | Lotan et al. | 340/172.5 |

*Primary Examiner*—Mark E. Nusbaum
*Attorney, Agent, or Firm*—Cameron, Kerkam, Sutton, Stowell & Stowell

[57] ABSTRACT

The disclosure describes an improved apparatus for simultaneously transferring data or commands between several peripheral devices and a central processing unit. The apparatus includes a peripheral control unit which links the central processing unit to several peripheral devices. The peripheral control unit operates as a master with respect to the central processing unit and the peripheral devices in order to increase the capacity of the central processing unit.

10 Claims, 29 Drawing Figures

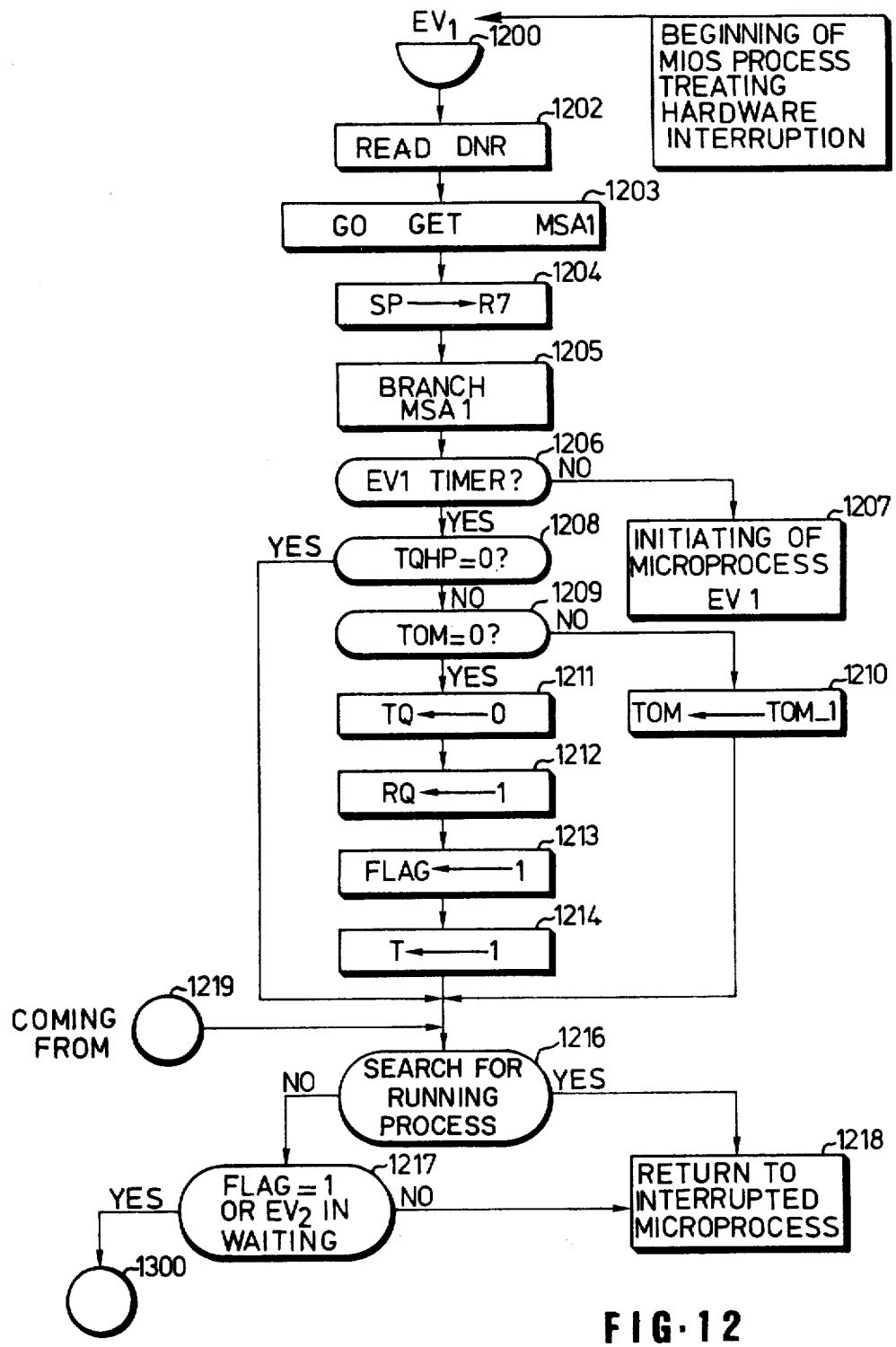
FIG·12

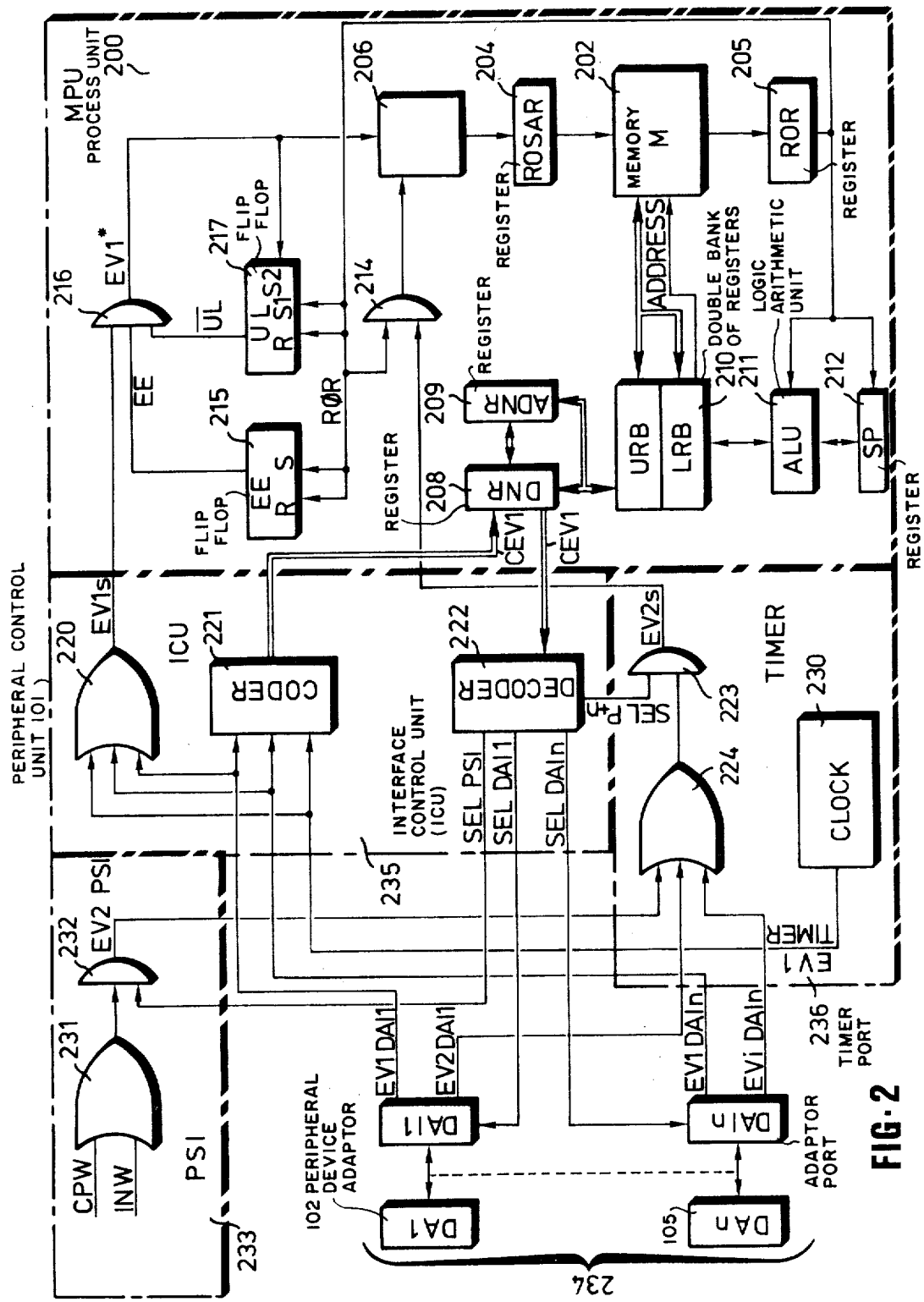
FIG·2

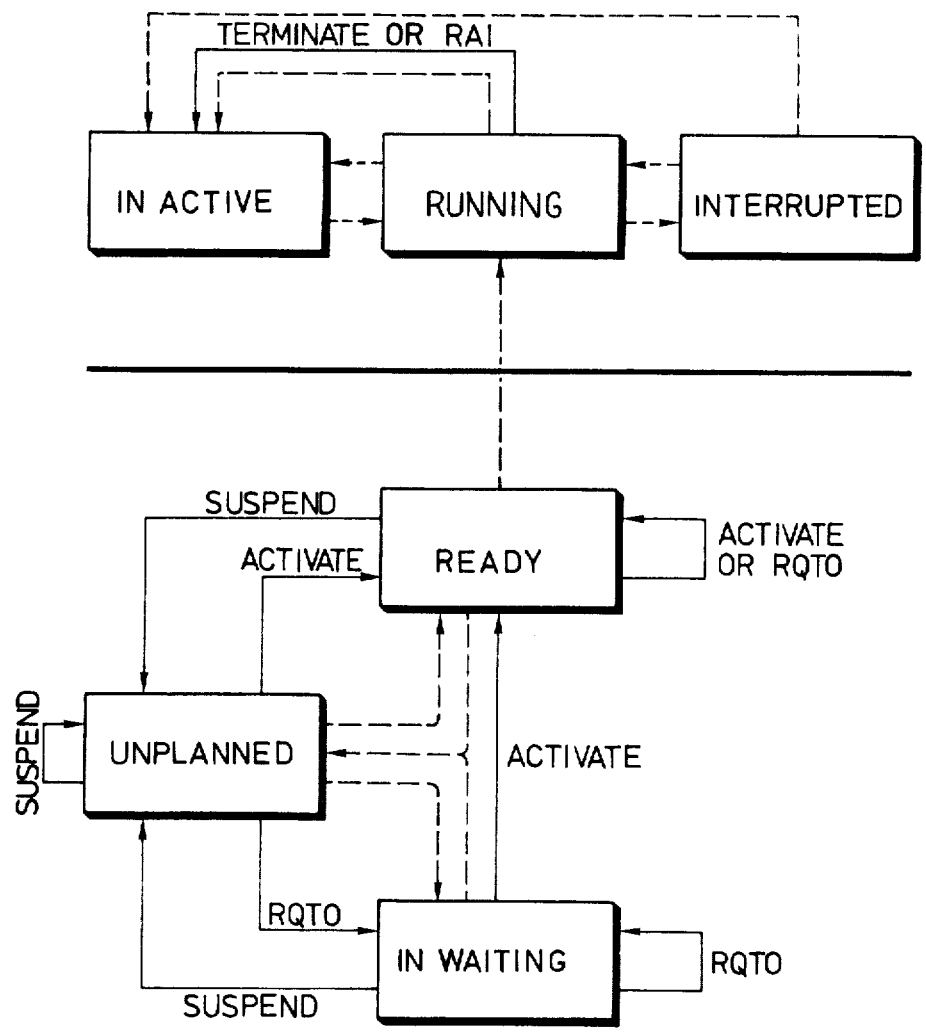
FIG·3

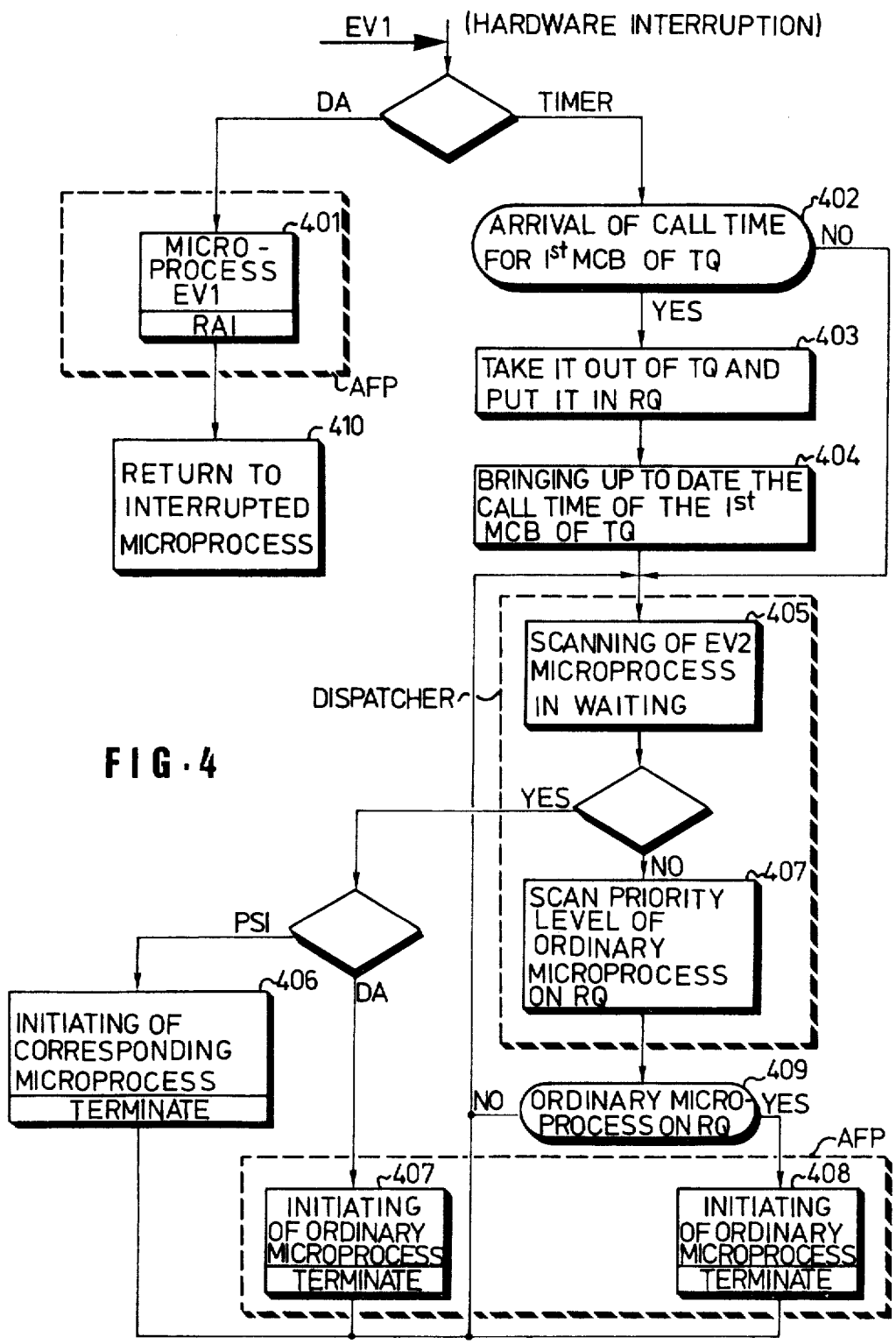
FIG·4

FIG. 5

| | |
|---|---|
| 0 | MSA1 |
| 1 | WZA1 |
| 2 | MSA2 |
| 3 | WZA2 |
| 4 | FLC / LCNB |
| 5 | FMCBA |
| 6 | MCBNB / E / S |
| 7 | |

DACB / MOT

FIG. 6

| | 0 | 3 | 8 | 10 | 12 13 | 15 |
|---|---|---|---|---|---|---|
| 0 | DA | | LEVEL | | ETATS | TQRQ |
| 1 | NLP | | | | | |
| 2 | PLP | | | | | |
| 3 | ABSA | | | | | |
| 4 | ABWZA | | | | | |
| 5 | | | | | | |
| 6 | TOM | | | | | |
| 7 | | | | | Y REDY | |
| | 0 | 3 4 | 7 8 | 10 11 | | 15 |

MCB / MOT

FIG. 7

| | 0 | 2 | | | |
|---|---|---|---|---|---|
| WORD CPCW | NPC | | M | L | D P F |
| | TQHP | | | | |
| | LCM | | | | |

FIG. 8

| RQHP | | |
|---|---|---|
| TQHP | | SP |
| B | DAN | |
| RETURN ADDRESS | | |
| BANK OF REGISTERS | | |

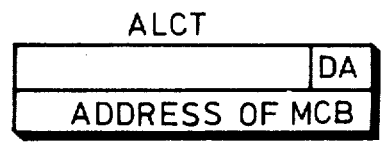
FIG·9
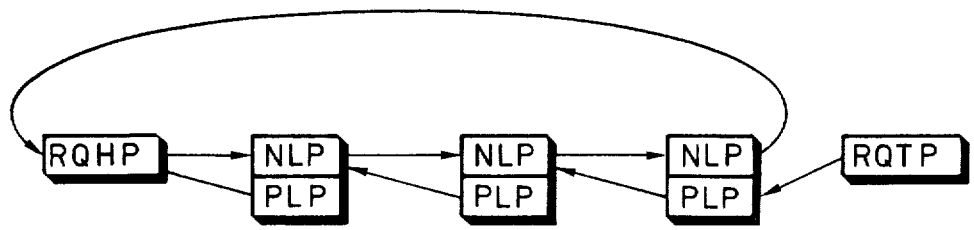
FIG·10a
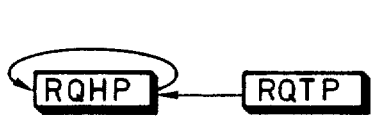
FIG·10b
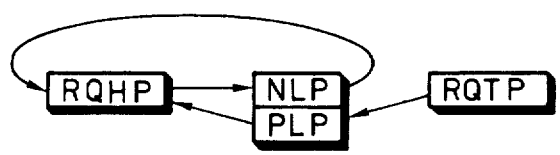
FIG·10c
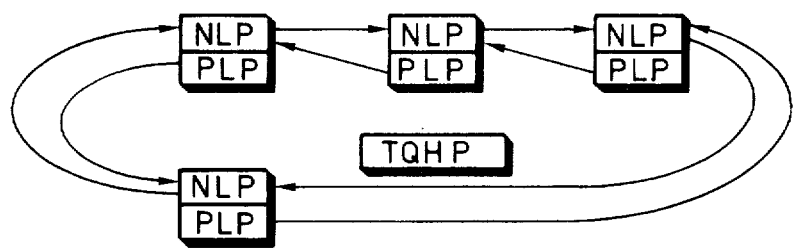
FIG·11a
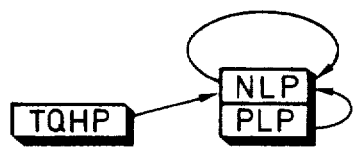
FIG·11b
FIG·11c

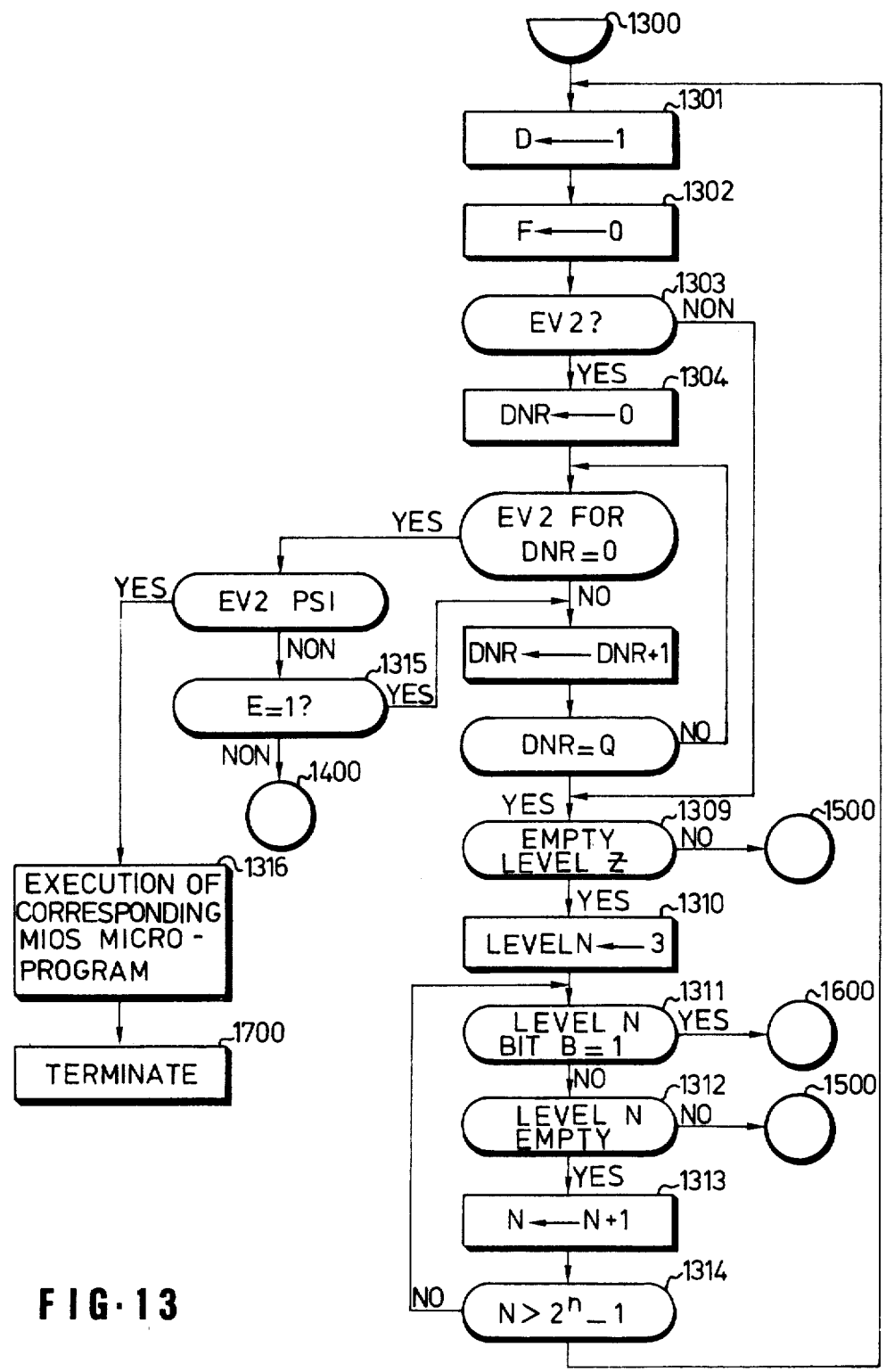
FIG·13

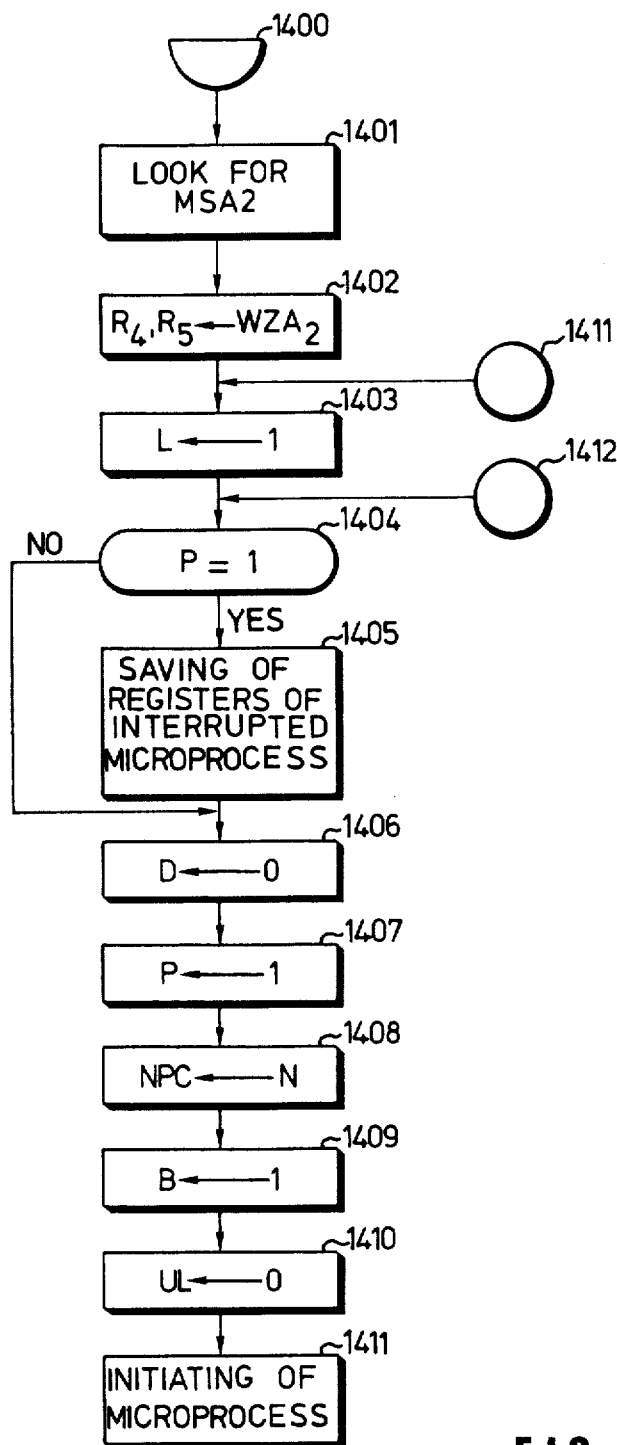
FIG·14

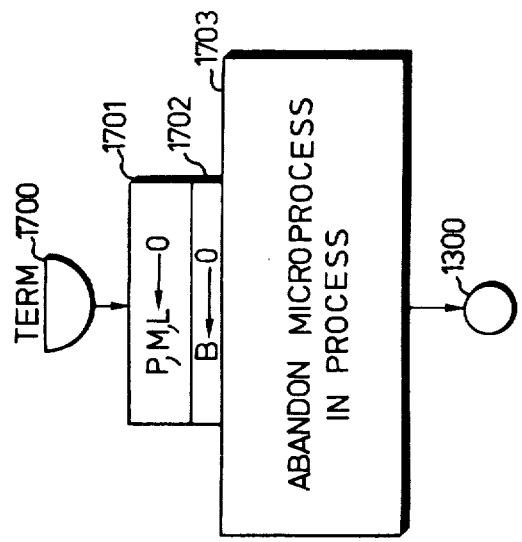
FIG.17
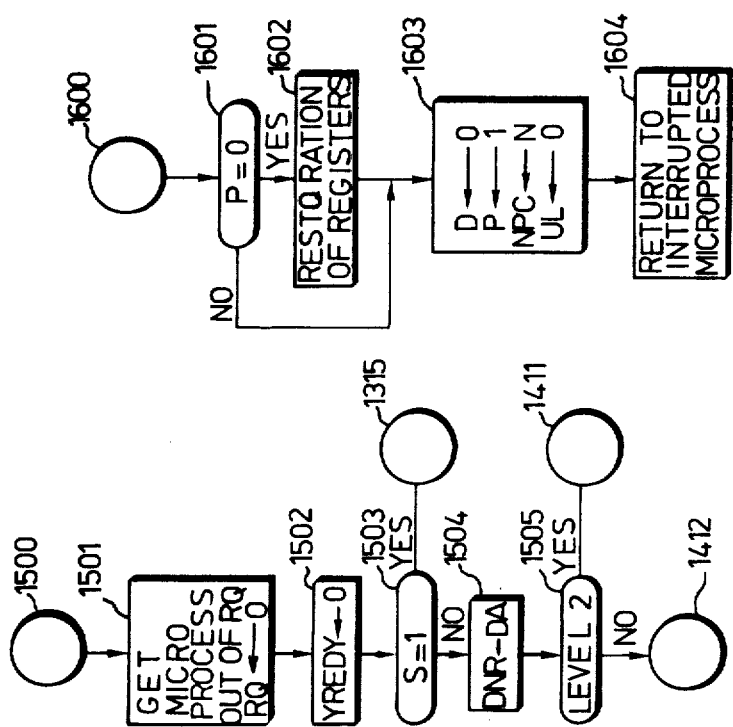
FIG.16
FIG.15

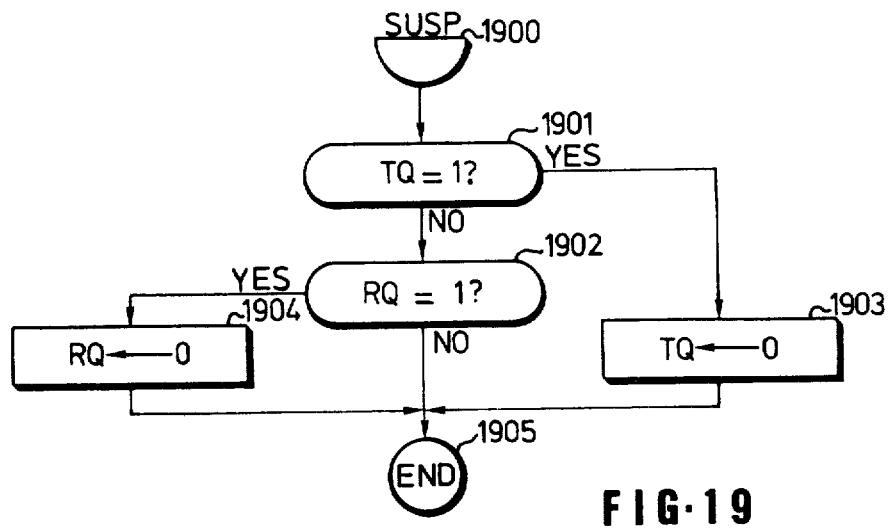
FIG·19
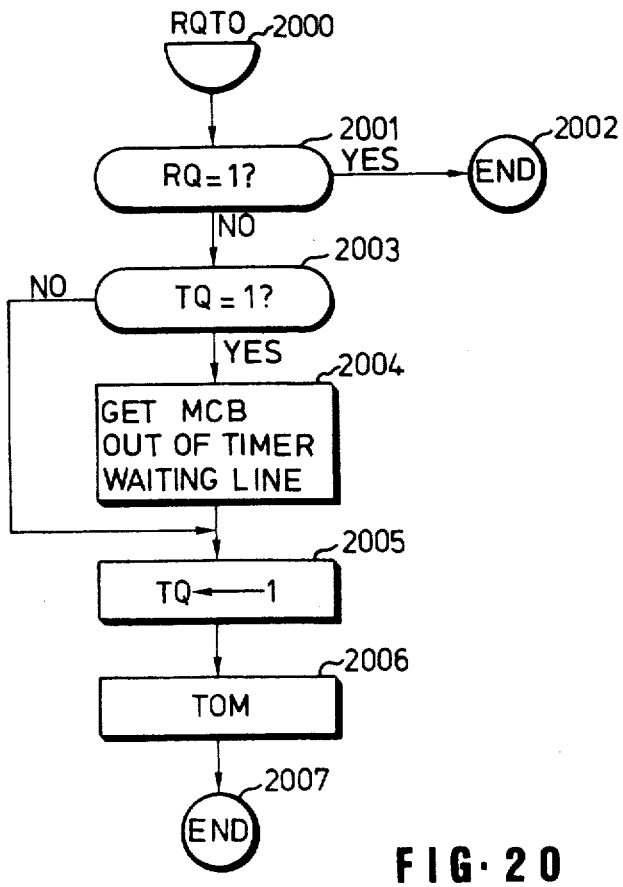
FIG·20

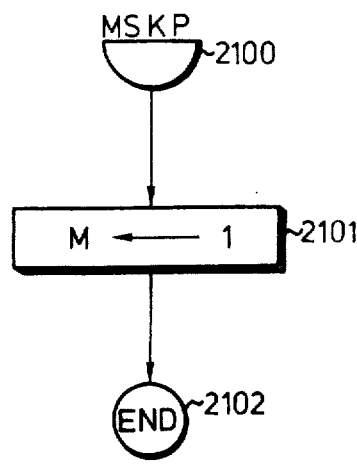
FIG·21
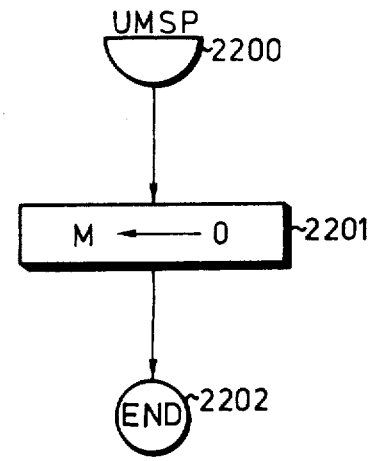
FIG·22
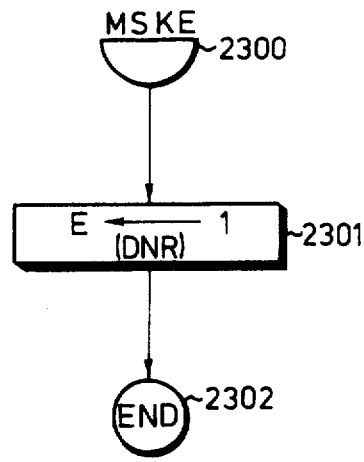
FIG·23
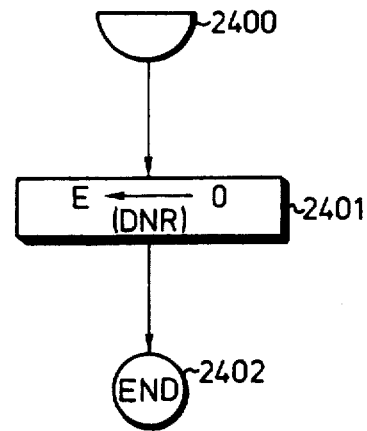
FIG·24

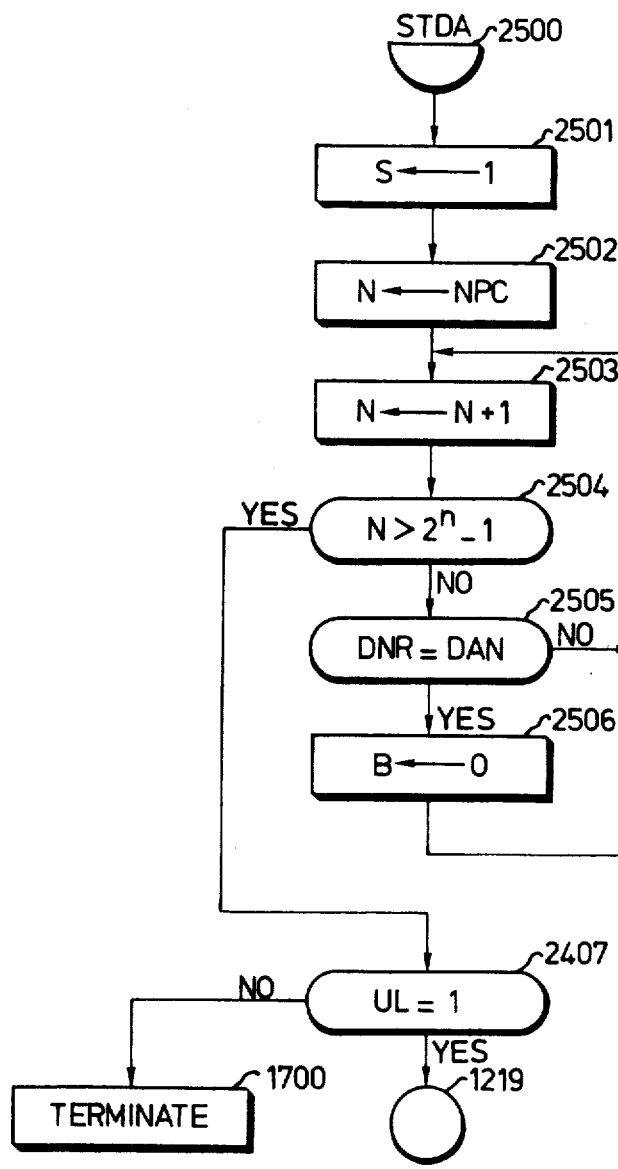
FIG·25

APPARATUS FOR SYNCHRONIZING TASKS ON PERIPHERAL DEVICES

BACKGROUND AND SUMMARY OF THE INVENTION

The present invention relates to data processing systems and more particularly relates to apparatus for controlling peripheral devices associated with data processing systems.

One object of the present invention is the optimizing of the execution of several microprocesses in a multiprogrammed system for the processing of data.

In data processing systems, it is classical to use an input-output control program, or channel program, to define the types of transfers which must take place between the central processing unit and a peripheral device. When the program which is being executed has an input-output operation to perform, the instruction indicates the address of the peripheral device on which the operation must be performed, as well as the address of the corresponding channel program or control address. The address of the peripheral device and the control address are transferred into an input-output register. The address of the peripheral device is transmitted on a bus which connects the peripheral devices to the central unit; the peripheral device recognizes its own address and responds to the central unit by indicating its state. If the peripheral device is not available, the control data and the peripheral device number are stored into a queue to be referred to again a moment later. If the peripheral device is available, a connection is established and the transfer of data is initiated. The channel program is commenced and the execution of each order takes place as called for by the peripheral device, until the last order has been executed. The initialization of a transfer of data may take place in the other direction. In this case, the peripheral devices request an order. The central unit determines, among all order requests, the one which has the highest priority. Once that stage has been completed, the connection between the peripheral device having the highest priority and the central unit takes place. The peripheral device then sends a transfer request indicating whether the transfer is input or output. The transfer then is executed and it may or may not be followed by other transfers. The end of the exchanges is indicated by an end of order request messages.

In a multiprogrammed data processing system which has several peripheral devices, the linking of the input-output operations is done by means of interrupt messages. The interrupt normal occurs at the end of the execution of a task on a peripheral device, but there may be other causes for interrupts. When an interrupt message is detected, it is usual for the operating system to examine the active microprocesses which are ready to be executed. The system then gives transfer control to the microprocess which has the highest priority over the other microprocesses to be executed, and so forth. A system exists whereby low priority microprocesses are given control when these microprocesses have been queuing for execution for a long enough period of time.

By using channel programs in processing devices, the central unit becomes completely independent of peripheral device management. However, the channel programs themselves do not enable the simultaneous management of several peripheral devices, but require the completion of microprocesses one-at-a-time. Certain peripheral devices may have to queue for a considerable period of time before being granted control of the corresponding channel program; this usually occurs for slow peripherals.

The present invention has as one purpose the creation of a mechanism which, from an overall point of view, makes possible the simultaneous control of the microprocesses. In other words, the invention renders transparent the link between the central unit and the various peripheral devices.

The present invention provides an organization of a data processing system which is multiprogrammed, which includes a central processing unit (CPU) connected to peripheral control units PCU, in which each peripheral control unit works as a master mode with respect to the central unit and to the peripheral devices in order to increase the processing capacity of the central unit, and in which the connection between the central unit and the peripheral devices through a peripheral control unit is transparent enough so that the execution of the various microprocesses by the peripheral control unit is simultaneous. As a result, the microprocesses are distributed in a judicious manner both in space and in time. Distribution in space takes place in suitable memory fields; the distribution over time is obtained by defining specific times of initiating and linking the microprocesses among themselves when an interruption occurs or when a microprocess has been completed. In order to achieve those ends, the present invention provides the PCU with a "Firmware".

The "Firmware" includes a set of microprograms, and of tables or Micro-operating systems (MIOS) which coordinate and render optimum the operations in the PCU. The firmware also includes a set of microprograms and of tables to control the peripheral devices. The microprograms which constitute the MIOS control a multiprogrammed clock, the treatment of the interruptions of the hardware, and the control of the microprocesses for the purpose of their execution. The whole of the microprograms and the tables necessary for the control of a group of homogeneous peripheral devices, such as a group of card readers of different types, will be designated by the term "Attachment firmware package" (AFP). There exists a version of Firmware suitable for each particular configuration of peripheral devices attached to the PCU and each version of Firmware works under the supervision of the MIOS. An AFP executes the orders elaborated by the MIOS or by the channel programs (through the MIOS) and takes into account the signals of the peripheral devices. The AFP contains the following elements:

1. One or several control blocks (DACB) of peripheral device adaptors (DA). Each DACB defines the space of data and the space of microprograms in memory, that is, all of the resources assigned to the AFP to control the peripheral devices connected to the peripheral device adaptors.
2. A group of control blocks (MCB) of microprocesses. Each MCB controls a microprocess which will be activated to execute the specific functions of the attachment.
3. A group of microprograms. The micro-programs may be re-entering, so as to facilitate their division into several microprocesses.
4. Data fields which contain either permanent or transient data relative to the various microprocesses of the AFP.

A microprocess is a series of microprogrammed operations which when executed, generate a sequence of microinstructions without simultaneity; within the framework of this specification, a microprocess appears as the potential execution, by means of microinstructions, of asynchronous specific functions under the control of an AFP. Microinstructions corresponding to a microprocess are "running" when the microinstructions are being executed. A microprocess is "activated" when the microinstructions corresponding to the microprocess are running. A microprocess may be activated either by the MIOS at the time of appearance of one or several specific events, or at the call of an AFP. A microprocess may belong to one or to the other of the following two classes. The first class is composed of the microprocesses called EV1 and EV2 which have the properties of being automatically initiated at the start of events called EV1 and EV2 (i.e., at the notification of events No. 1 and No. 2), and of being nonaddressable by other microprocesses. That is, the other microprocesses cannot have any affect on them. The second class is called the class of ordinary microprocesses. The ordinary microprocesses can be addressed by other microprocesses by means of control blocks (MCB) of associated microprocesses. The name of an ordinary microprocess is defined by the address of its MCB. The name of each MCB is known to AFP; it has been defined at the time of the assembling (See Glossary for definition).

DESCRIPTION OF THE DRAWINGS

Other objects, features, and advantages of the present invention will appear in the following description and drawings in which:

FIG. 2 is a schematic, block diagram of the peripheral control unit (PCU) shown in FIG. 1;

FIG. 3 represents the state transitions of various microprocesses;

FIG. 4 is a flow diagram which describes the actions caused by a hardware interruption EV1, and the interactions of the MIOS and the microprocesses;

FIG. 5 represents the format of a control block DACB of a peripheral device adaptor;

FIG. 6 represents the format of a control block MCB of microprocesses;

FIG. 7 represents a memory field M which gives the formats of the words CPCW, TQHP and LCM;

FIG. 8 represents the format of a table of the dispatcher;

FIG. 9 represents the format of an ALCT table;

FIGS. 10a, b, c are a representation of a linking of the MCB on a Ready queue;

FIGS. 11a, b, c are a representation of a linking of the MCB in the "TIMER" queue;

FIG. 12 is a flow diagram which shows the succession of the operations which have to be performed when an event EV1 appears on an adaptor of peripheral devices, or on the TIMER;

FIG. 13 is a flow diagram which illustrates the functioning of the "dispatcher" or distributor of microprocesses;

FIG. 14 is a flow diagram which illustrates the initiating mechanism of a microprocess EV2;

FIG. 15 is a flow diagram which illustrates the initiating of an ordinary microprocess;

FIG. 16 is a flow diagram which shows the steps necessary for the return to an interrupted microprocess;

FIG. 17 is a flow diagram representing the actions which take place as a result of a microinstruction "TERMINATE";

FIG. 19 is a flow diagram representing the actions which take place as a result of a microinstruction "SUSPEND";

FIG. 20 is a flow diagram representing the actions which take place following an "RQTO" microinstruction;

FIG. 21 is a flow diagram representing the masking operation of all of the microprocesses which are not EV1 in PCU;

FIG. 22 is a flow diagram representing the corresponding unmasking operation;

FIG. 23 is a flow diagram representing the masking operation of the EV2 of an adaptor of a peripheral device;

FIG. 24 is a flow diagram representing the unmasking operation of the corresponding EV2; and FIG. 25 is a flow diagram representing the actions which take place following the STDA microinstruction.

DESCRIPTION OF THE PREFERRED EMBODIMENT

Figure 1:
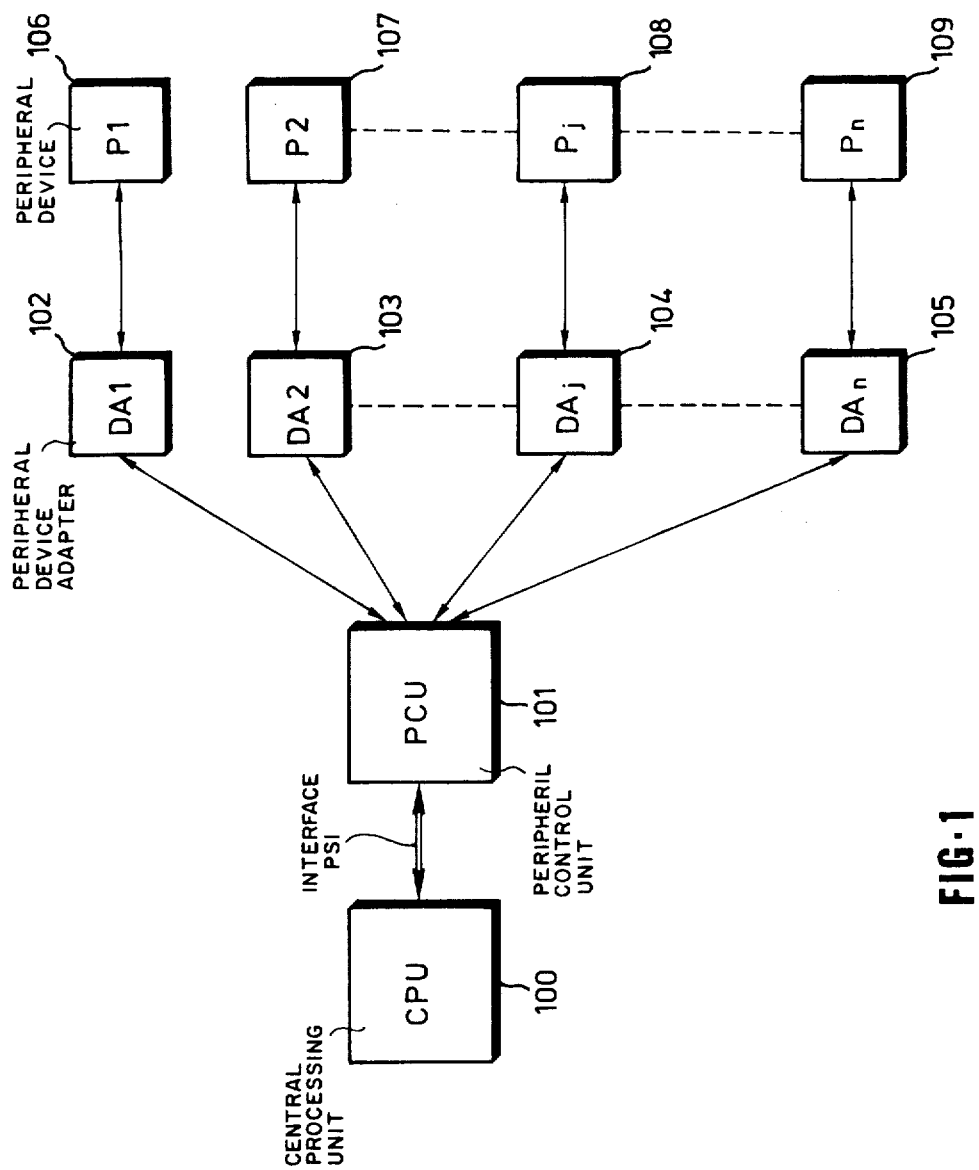
FIG. 1 is a schematic, block diagram of a preferred form of apparatus made in accordance with the present invention, including a central processing unit (CPU), a peripheral controller unit (PCU), and various peripheral device adaptors DA.

FIG. 1 represents a data processing system, composed of a central processing unit CPU100, connected to a peripheral control unit PCU101 through an interface PSI, as illustratively disclosed in U.S. Pat. No. 3,582,903. All of the information which must be transmitted to a peripheral device from the central processing unit 101 is transmitted by interface PSI through the PCU 101. Blocks 102 to 105 constitute the various adaptors of peripheral devices which are connected to the peripheral control unit PCU101 and to blocks 106 to 109 associated with them, which represent the various peripheral devices P1 to Pn.

FIG. 2 represents PCU101 seen in FIG. 1. Only those hardware elements necessary for the comprehension of the PCU are represented in FIG. 1. A more detailed description of the PCU is found in copending U.S. Pat. application No. 566,024, filed Apr. 7, 1975, which is incorporated by reference. The control portion of the PCU is composed of: a processing unit MPU200; an interface controlling unit ICU235; an array 234 of $n$ adaptor ports DAI to DAIn for peripheral adaptor devices, each port being connected to a corresponding device adaptor DA (only DAI1 and DAIn are represented); $p$ PSI ports, PSI1 to PSIp, (only one PSI gate 233 is represented) for the dialogue between the central unit CPU100 and the peripheral control unit PCU101; and a TIMER port 236 for the generation at regular times of an EV1 TIMER interruption. Illustratively, the peripheral adaptor devices may take the form of the apparatus disclosed in U.S. Pat, NO. 3,582,903.

Each port is assigned a number: there are assigned to the PSI ports the numbers 0 to $p - 1$; to the DAI adaptor port the numbers $p$ to $p + n - 1$ and to the TIMER port the number $p + n$.

The processing unit MPU200 is essentially composed of: a memory M202 which stores microprograms and the MIOS tables, as well as the microprograms and the tables of each AFP; a ROSAR REGISTER 204 which contains the address of the next instruction which is being executed and which governs the various transfers and operations of the MPU200 and of the ICU235; an operator 206 which calculates the address of the following microinstruction from data supplied by the microinstruction executed, or from testable flipflops, or from external events signaled by hardware interruptions of a double bank of registers 210 divided into a bank of upper registers URB and a bank of lower registers LRB which operate as working registers making possible the transfer or the reception of data going to or coming from the ICU235, or an exchange of data with memory M202 or with an logical arithmetic unit 211, or with the register DNR208 which memorizes the number of the peripheral device adaptor DAI to DAn on which work is being performed or is to be performed.

The selection of the bank of upper registers URB or of the bank of lower registers LBR of the double bank of registers 210 is executed by means of the flipflop UL217. When flipflop 217 is forced to logical level 1, the bank of upper registers URB is selected. Flipflop UL217 is switched to logical level 1 when signal EV1, which signals the appearance of an EV1 event, is present. That process makes it possible to use the registers of the lower bank LBR for the execution of the ordinary microprocesses, and of the upper bank URB for the EV1 microprocesses. Thus, at the time of the appearance of an EV1 event which has priority, it is not necessary to save the data of the interrupted ordinary microprocess, which is in the lower register bank. In order to start again the interrupted ordinary microprocess, the UL flipflop 217 is set back to zero, and it selects the lower register bank 210 in which there is preserved the data of the ordinary microprocess which was present at the time of the interruption. Setting flipflop UL217 in state 1 invalidates the EV1 signal which indicates the existence of an EV1 event at the input of logical AND gate 216. In this way, one EV1 microprocess is incapable of being interrupted by another EV1 microprocess. Flipflop EE215 makes it possible to mask the EV1 interruptions. Its value can be modified by a microprogram. The logical 0 level of flipflop EE215 prevents the transmission of the EV1 signal through AND gate 216 in order to prevent the interruption of the microprocess which is being executed.

When a microprocess being executed on a peripheral device adaptor DAI to DAn is interrupted, an ADNR register 209 preserves the number of the peripheral device adaptor. Register 209 is loaded at the same time as the DNR register 208. When the interrupted microprocess is resumed, the number stored in ADNR209 is restored in DNR208. This operation enables the connection of the peripheral device adaptor, and the resuming of the interrupted microprocess which requires the resetting to zero of the UL flipflop 217.

Register SP212 is associated with the logical arithmetic unit 211. SP212 enables the identification of a null result or an overflowing at the time of an operation in the logical arithmetic unit.

The interface control unit ICU235 includes a coding device 221, an illustrative embodiment thereof being disclosed in copending U.S. Pat. application Ser. No. 566,024, filed Apr. 7, 1975, executed with the help of a combinatory logical circuit which makes it possible to identify each EV1 signal by the corresponding port number. The logical circuit gives priority to the EV1 signal which is present on the DAI or TIMER ports having the lowest number (EV1 TIMER has less priority). ICU235 also includes a decoding device 222 for decoding the content of register DNR208, in order to select the port DAI, PSI or TIMER 236, and an "OR" gate 220 to signal to the MPU200 the presence of an EV1 signal. An illustrative embodiment of the decoding device 222 is disclosed in U.S. Pat. application Ser. No. 566,024, filed Apr. 7, 1975. The main function of the TIMER port 236 is to deliver, from clock 230, an EV1 signal at regular times.

The EV1 signals are transmitted to coding device 221 which delivers, in binary form, a CEV1 code corresponding to the EV1 signal having the highest priority. Code CEV1 is loaded into register DNR208.

When one or several EV1 signals are present on a DA1 or on a TIMER port, the logical "OR" gate 220 delivers an EV1s signal which, when logical AND gate 216 is validated, is transformed into an EV1 signal which interrupts the microprocess being performed, if any, and initiates microprocess EV1 indicated by code CEV1 found in Register DNR208.

The EV2 signals are transmitted to the input of "OR" gate 224 located in the TIMER port 236 the output of which is connected to the input of the "AND" gate 223. Another input to AND gate 223 is validated by the signal "SEL $p + n$" (selection of the TIMER port coming from decoding device 222). The output of AND gate 223 delivers an UEV2s signal which will be tested in an AND gate 214 by the content of a microinstruction of Register ROR205. Port PSI233 produces an EV2 signal, especially when a channel program is waiting or when another instruction is waiting in the CPU100. The PSI port then receives at the input of the "OR" gate 231 the CPW and the INW signals which are validated at the input of the AND gate 232 when the PSI port 233 is selected by decoding device 222.

In short, there exists only one interruption of the hardware caused by the appearance of at least one EV1 signal on one of the DAI and TIMER ports. When the EV1 signal appears, and if it is not masked, it causes the setting to a logical 1 of the flipflop 217, the backing up of the content of register DNR208 in the register 209, the transfer of the CEV1 code into the register 208, the backing up of the address of return to the ordinary microprocess which has been interrupted in registers RE and RF (not represented) within the bank of upper registers of the double bank 210 of registers, the backing up of the content of register SP212 in register R7 (not represented) within the bank of upper registers of the double bank of registers 210, the unconditional branch by the MIOS toward the initial address of microprocess EV1 calculated from the content of the register 208, and the running of the EV1 microprocess which is being carried out under control of the MIOS.

The return to the interrupted microprocess is commenced when microinstruction RAI (Return After Interruption) is reached during the running of job EV1. RAI causes the resetting to zero of the flipflop 217, the transfer of the content of the register 209 into the register 208, and the unconditional branch toward the address of return to the ordinary microprocess which has been interrupted, found in registers RE and RF of the bank of upper registers URB, the content of register SP212 being restored by the content of register R7 of the bank of upper registers of the double bank of registers 210 by a microinstruction which precedes microinstruction RAI.

The various operations are processed by MPU200 with the help of microinstructions which are located in the memory M202. The 16 bit format of those microinstructions is fixed and the first four bits indicate the operation code. The operation code may have one of the following significations: it may indicate logical or arithmetic operations, input-output operations, read-write operations in the memory 202, a conditional or unconditional branch with or without the saving of registers, or a transition of state to be performed on a microprocess for the mechanism of control of the microprocess.

FIG. 3 represents in simplified form the state transitions of the various microprocesses, the states being defined as follows:

There may be associated with each microprocess, at any moment, a state variable called the present state of execution. The present state of execution may be: running, interrupted or inactive. The running state signifies that the microprocess is in process of being executed. That is, data corresponding to the microprocess is being transferred between the central processing unit 100 and a peripheral device. The information created by the execution of the microprocess is present in the registers of the PCU. The interrupted state is caused when the microprocess looses control of the PCU100 because another microprocess having a higher priority has been placed in the running state. The interrupted microprocess will be started again a short time later. The information created in the PCU registers at the time of execution of the microprocess prior to its interruption will be saved, and the contents of those registers will be restored when the microprocess is started again. The inactive state indicates a microprocess which has not been started yet, or which has been completed. It is also possible at any time to associate with each ordinary microprocess one of three subsequent states which determines the handling of the microprocess during the next in process state: the ready state, the waiting state or the unplanned state. Those states only exist for the ordinary microprocesses, and they are controlled by the associated job microprocess control block or MCB. A microprocess is in the ready state when there has been a call for its execution as soon as possible. The MCB which controls that microprocess is stored in a Ready queue RQ. A microprocess is in the waiting state when there has been a request to put that microprocess into execution at the end of a time which is definite at the moment of the request; this microprocess remains in the waiting state as long as the time interval has not elapsed. The MCB which controls that microprocess is stored in a "TIMER" queue line called "TQ". When a microprocess is neither in the ready state, nor in the waiting state, it is said to be in the unplanned state. For example, a microprocess which comes out of the RQ and moves into the running state passes into the unplanned state. The above-described subsequent states of an ordinary microprocess are visible inside the associated MCB; they may be modified by another microprocess or by the same microprocess, or by a decision of the MIOS. In the first two cases, a microinstruction of control of a microprocess has been executed.

In FIG. 3, the transitions in dotted lines are decided by the MIOS or by the data for the EV1 microprocesses. Those which are represented in solid lines are provided for by microinstructions which have the following significations. The microinstruction RAI is the last microinstruction of an EV1 microprocess. As the state of execution passes from the "running" state to the state "inactive", it is possible to restart the microprocess which has been interrupted after the interruption has been executed. The microinstruction "TERMINATE" is the last microinstruction executed by a microprocess which is not an EV1 microprocess, as the state of execution passes from the state "running" to the state "inactive", the subsequent state of execution, which is defined only for ordinary microprocesses, is not modified.

The following microinstructions do not modify the state "running" of a microprocess which executes them; they modify the subsequent state of an ordinary microprocess which is designated by its MCB. The microinstruction "ACTIVATE" makes it possible to place the value of the subsequent state of execution of a microprocess into the state "READY", whatever may be the state in which it is prior to said microinstruction. The microinstruction RQTO modifies the value of the subsequent state of the microprocess referred to in the following manner:

- if the present value of the subsequent state of execution is either the unplanned or the waiting state, the value of the subsequent state passes into the waiting state and the specific time which determines the passage of a microprocess into the ready state will be memorized in its MCB, and will be used by the MIOS.
- if the present value of the subsequent state of execution is the "ready" state, its value shall not be modified.

The microinstruction "SUSPEND" makes it possible to place the value of the subsequent state of execution into the unplanned state, whatever may be the state in which it is prior to said microinstruction.

There exists an STDA microinstruction, not represented in FIG. 3, which cancels all of the microprocesses of an AFP.

The system of interruption of the microprocesses is of two orders, one corresponds to the interruptions caused by the appearance of an EV1 event, the other corresponds to the initiating of the ordinary microprocesses. There exists only one level of interruption by the hardware which is reserved to the EV1 microprocesses. Generally speaking, all of the microprocesses can be interrupted by that level; however, the execution of an EV1 microprocess cannot be interrupted by another EV1 of the same level, the interdiction being caused by the hardware. As shown in FIG. 2, the initiation of an EV1 microprocess sets the UL flipflop 217 at a logical 1, so that its output UL does not validate any longer the input of AND gate 216. Any appearance of a new EV1 signal, therefore, remains without effect on the execution of the EV1 microprocess which is in process of execution. It is also possible to mask the appearance of the EV1 signals by means of microinstructions when flipflop EE215 is at the logical zero level, or in each DAI port by means of an EL flip flop which is not represented, placed at logical 0 level.

The other level of interruption is a Firmware level. Any ordinary microprocess can be interrupted by an ordinary microprocess having a higher priority, or by an EV2 microprocess; however, an ordinary microprocess may be rendered non-interruptible by microinstructions. The microinstruction MSKP makes it possible to mask all of the non-EV1 jobs. The microprocess in process is then temporarily considered as being at level 2, and it cannot be interrupted by another ordinary microprocess. The unmasking operation is performed by a UMSP microinstruction. There also exists a possibility of masking an EV2 microprocess by executing an MSKE microinstruction which is done by means of another microinstruction EMSE.

The functional diagram in FIG. 4 summarizes in a schematic manner the actions caused by a hardware EV1 interruption.

Starting with the top of the diagram, and progressively moving downward, the linking of the operations to interrupt the microprocess which is running, if there is one, and the analysis of the waiting queues of jobs at each level of priority, for the purpose of initiating a microprocess having a higher priority, if there is one, is as follows: An event EV1 may come either from a DAI port or from a clock impulse delivered by "TIMER" port 236 at a set time, for example every millisecond. If EV1 comes from a DAI port, the microprocess in process, if there is one and if it can be interrupted, is interrupted, and the EV1 microprocess associated with the corresponding DA is initiated at step 401. The execution of the last microinstruction RAI causes a return to the interrupted microprocess at step 410, if there was one. EV1 may also come from the "TIMER" port. In that case, the TIMER queue is brought up to date by determining whether the revival time of the first MCB in the TIMER queue has reached step 402. If so, that MCB is placed in the Ready queue (step 403), and the updating of the revival time of the following MCB is done (step 404). If not, the revival time of the first MCB is updated. When the updating of the TIMER queue is completed, a microinstruction tests the input of AND gate 214 in FIG. 2, to see whether there does not exist at least one EV2 signal present on one of the DAI or PSI ports. Then the line of the EV2 microprocess is scanned (step 405). If an EV2 signal is present, the corresponding EV2 microprocess is initiated by the MIOS (steps 406 and 407).

An EV2 signal may belong to a physical channel of a PSI interface connecting the central processing unit 100 with the peripheral control unit 101, or to a DAI port, signaling that an event has occurred in the central processing unit, or on one of the peripheral devices DA. Once the last microinstruction of an EV2 microprocess has been executed, the process of scanning the EV2 microprocess starts again to see whether there is another EV2 microprocess to be initiated. If there is one, the preceding process is repeated; if not, the various levels of ordinary microprocess priority are scanned (step 407), starting with the highest level and decreasing in the order of the priority numbers. If an ordinary microprocess is encountered on a level, the microprocess is initiated (step 408) and is performed, instruction-by-instruction, until the instruction "TERMINATE" is reached, which enables the scanning of the EV2 microprocess again.

Of course, it is possible for an ordinary microprocess to be interrupted by the appearance of an EV1 signal. In that case, the process starts again with step 400 at the top of the diagram. The scanning of the time queue, which has just been described and which is executed in the PCU, is called the "dispatcher".

FIGS. 5 to 8 represent the tables of the parameters which are located in the memory M202 in FIG. 2, and which constitute elements of the firmware used for the control of the microprocesses.

FIG. 5 represents the format of a control block DACB of an adaptor for a peripheral device DA. An algorithm makes it possible to find again, from the number of the DAI port, the address of the associated DACB. Each DACB occupies a space of the memory M202 and controls the operations on the DAI port associated with it. The word 0 contains the absolute starting address designated by MSA1 of the microprocess EV1. The word 2 contains the absolute starting address of the EV2 microprocess. The word 3 contains the absolute address of data specified by the AFP and necessary for the execution of an EV2 microprocess. The word 4 is composed of a first BYTE designated by FLC which contains the first number of a logical channel, and of a second BYTE which designates the number of logical channels associated with the DAI port. (See the glossary for the definition of a logical channel). The word 5 contains the absolute address FMCBA of the first MCB associated with DAI port. BYTE 2 of word 6 contains the bits E and S of the state of the adaptor of the peripheral device. If bit E equals 1, the event EV2 of the DAI port is masked. If bit S equals 1, all of the operations on port DAI have been stopped (no associated microprocess can be performed anymore).

FIG. 6 represents the format of a control block MCB of a microprocess. Each MCB occupies a space in memory M202 in FIG. 2, and it contains the information necessary for the governing and the execution of the associated microprocess. An MCB is composed of 8 memory words, each word having a 16 bit dimension. Bits 0 to 3 of word 0 establish the number of the DAI ports to which the MCB is connected. Bits 8 to 10 of word 0 determine the priority level of the microprocess which is associated with the MCB. Bits 12 and 13, respectively TQ and RQ of the word 0, establish the subsequent state of execution of the microprocess. The logical product TQ.RQ has the following meanings:

TQ.RQ equals 00, no state is provided for that microprocess.
TQ.RQ equals 01, the microprocess is waiting in the TIMER queue TQ.
TQ.RQ equals 10, the microprocess is in the ready state in the ready queue (RQ).
The words 1 and 2, represented by NLP and PLP respectively, shall be described below.
Word 3 has no signification in the present invention.
Word 4, indicated by ABSA designates the starting address of the microprocess which is associated. Word 5 or ABWZA designates an absolute address of work field which shall be used by the microprocess as a basic address.
Word 6 indicated by TOM shall be described below.
BYTE 1 of word 7 has no significance in the present invention.

Bits 8 to 15 of word 7 define a so-called YREDY field which indicates the reasons for which the associated microprocess has changed its state. After the microprocess has been started, the YREDY field is loaded in a register R1, not represented, of the double bank of registers 210 in FIG. 2.

Bit 11 or bit A of word 7 signifies that the subsequent state of the microprocess has moved into the ready state by means of an "ACTIVATE" microinstruction generated by the AFP attached to that MCB. Bit 12 or bit T of word 7 signifies that an RQTO microinstruction has placed the microprocess into the waiting state, giving it a time lapse for its passage into the ready state, and that said period of time is now gone.

The other bits of YREDY define other events. Thus, they may indicate that a channel program has been issued by the CPU100 on a specific logical channel. The AFP is notified of that event, and it begins to treat the first CCE of that channel program. The PCU101 is warned of that event by the signal CPW on a port PSI233 in FIG. 2. The sequences of initiating a program have been described in French Pat. Application No. 73 42714, and in the corresponding U.S. Application Ser. No. 527,758, entitled "Computer Interface Method and Apparatus", filed Nov. 27, 1974, in the names of Bienvenu, Ferdman and Verdie. Both of these applications are incorporated by reference. There also exists another bit of YREDY which signals that an ABORT cause (See glossary for a definition) has been detected by the MIOS, and the AFP is asked to give up the operations, i.e., suddenly to stop the channel program in process.

All of the information contained in an MCB shall be modified only by means of the microinstructions governing the microprocesses which will address the MCB by its absolute address.

FIG. 7 represents a field of the memory M202 in FIG. 2 which gives the formats of the words CPCW, TQHP and LCM, the addresses of which are fixed in the memory 202. The word CPCW gives the state of the microprocess which is in process of execution in the PCU100. Zone NPC is constituted by three bits ranging from bit 0 to bit 2, and it indicates the level of the microprocess which is running. Its three-bit dimension therefore makes it possible to fix or set six levels of ordinary microprocesses (0 is not affected, 1 is associated with EVL). It is evident that if the zone NPC were to contain $n$ bits, it would be possible to set $2n - 2$ levels of ordinary microprocesses. Bit M indicates that the sequence is masked, that is to say, that the microprocess which is in process of execution is temporarily of level 2. Bit L indicates that the microprocess is of level 2. Bit D signifies that the "dispatcher" is running. Bit P indicates that a microprocess is running.

It must be noted that bits M, L or D correspond to microprocesses which have a priority.

Bit F, called "flag", signifies that at least one microprocess has passed into the Ready queue (RQ) since the last passage into the "dispatcher". That event may cause changes in the priority of the microprocess to be performed.

The word TQHP determines the head of the TIMER queue. When the "TIMER" queue line is empty, the content of the word TQHP is null. The TIMER queue makes it possible to arrange or store the microprocesses in the order of their call time. The TIMER queue does not take into account the levels of priority.

The word LCM sets the maximum number of logical channels in the PCU101.

FIG. 8 represents the format of a table of the dispatcher as shown in FIG. 4. For each level of priority, there is assigned a table which is located in a field of memory M202 in FIG. 2; its address is calculated from the number of the corresponding level. It contains a first field RQHP which indicates the head of the Ready queue at that level, a second RQTP field which indicates the tail of the Ready queue at that level, and a third field which includes a bit B indicating that a microprocess at that level has been started, but not terminated (i.e., the microinstruction "TERMINATE" has not been executed). Field 4 and the following are fields for the saving of the registers in the PCU101 when the microprocess is interrupted by a microprocess having a higher priority. The DAN field saves the content of the register 208 DNR in FIG. 2; field SP saves the content of register SP212 in FIG. 2, in which there are stored the results of operations; the fifth field saves the address of the next instruction which was to be executed at the time of the interruption of the microprocess by the microprocess having the higher priority; the sixth and following fields make it possible to save the content of the general registers of the lower bank of registers of the double register bank 210 in FIG. 2 (only the ordinary microprocess may be interrupted to work in the lower bank).

FIG. 9 represents a fixed table ALCT in memory M202 in FIG. 2, which serves as an interface between MIOS and the firmware associated with the peripheral devices DA. With each logical channel LC there is associated a table which contains the number of the DAI to which the LC is connected, and the address of the first MCB corresponding to that LC.

FIGS. 10a, b, c and FIGS. 11a, b, c represent the RQ and TQ queues, respectively, which are two-directional queues. That is, each MCB in the queue contains indications which make it possible to connect it to the MCB preceding it, or to the one following it. Those two lines are characterized by the fact that both of them are using a pointer to designate the first MCB which it will be possible to move out of the queue. The pointers make it possible, through their content, to indicate whether the queue contains at least one MCB. When it is necessary to replace an MCB into a queue which initially was empty, the content of the pointer will indicate the address of that MCB. If an MCB goes back into a queue which already includes several MCB's the NLP and PLP indicators found in the first and in the second words of an MCB must assume values which make it possible for the NLP to find the address of the MCB which comes next, and for the PLP to find the address of the preceding MCB. When an MCB comes out of a chain, the value of the pointer must be changed by the address of the MCB which follows the MCB going out in the order of exit, and the PLP value of the following MCB must be brought up to date.

FIG. 10 represents the mode of chaining used for the Ready queue RQ of a level N. The movement of an MCB follows the rule of "first in, first out". That is, for a given level N, the first activated MCB is the first one executed. That queue is characterized in that it includes a head pointer RQHP, and a tail pointer RQTP; those pointers occupy a memory field defined by the first and second words of a table of level N of the dispatcher, as defined in FIG. 8. RQHP designates the first MCB of the queue, and RQTP designates the last one. Each MCB is connected to the preceding MCB and to the following one in the already indicated manner. However, the value of the PLP of the first MCB and the NLP value of the last one indicates the address of the pointer RQHP in the table of the dispatcher of level N, and the value RQTP indicates the address of RQHP. FIG. 10c represents the case in which a single MCB is chained on the line. RQHP then indicates the address of that MCB and NLP indicates the address of RQHP; PLP then indicates the address of the MCB.

FIG. 11a represents the mode of chaining of an MCB in a "TIMER" (TQ) queue. The timer queue is circular and it has neither a head nor a tail MCB. The MCB's are stored in the order of call which is defined in each MCB in word 6 or TOM (see FIG. 6). Each MCB is connected: to the MCB which precedes it by the indication PLP of word 2 of the MCB, and it is connected to the MCB succeeding it by the indication NLP of word 1 of the MCB. Pointer TQHP always points toward that MCB the call time of which is the closest. An MCB may be removed from the TIMER queue when the specific call time has arrived or before the call time has come, by an instruction "ACTIVATE". The MCB then passes into the Ready queue. The MCB has come out of the TQ queue by a microinstruction "SUSPEND". In all cases TQHP is going to point toward the address of the MCB which follows, indicated in the NLP word of the MCB which is moving out. The PLP value of the following MCB will be brought up to date to the PLP value of the PLP word of the MCB moving out. When there is only one MCB in the queue TQ, FIG. 11c, the TQHP content is set back to zero when the MCB moves out, a situation which by convention indicates that the TQ queue is empty.

When any MCB comes out of the queue, the value of the NLP of the preceding MCB becomes that of the NLP of the leaving MCB, and the PLP value of the succeeding MCB becomes that of the leaving MCB's PLP.

When an MCB is placed in the TIMER queue, if there exists no MCB in the waiting queue, pointer TQHP points toward the address of that first MCB. NLP and PLP then point on themselves, FIG. 11b. If there exists other MCBs waiting in the TIMER queue, that MCB is placed as a function of the indication of the content of word 6 (TOM) of the MCB behind the MCB the call time of which is immediately inferior to it. The value of its NLP assumes the value of the NLP of the MCB preceding it, and the value of its PLP assumes the PLP value of the MCB which succeeds it. The NLP value of the MCB preceding it, and the PLP value of the MCB following it will be changed into the address of the MCB which has just entered the queue.

The distribution of the microprocesses over time, as it has been defined in the principles of interactions of the MIOS and of the microprocesses, and illustrated by the functional diagram in FIG. 4, shall now be explained in its details, in the following description. In that description, the dynamic functioning of the system will be explained with the help of the hardware and firmware (microprograms and tables) described above.

FIG. 12 is a diagram which shows the succession of the operations to be performed at the time of a hardware interruption, that is to say when an event EV1 appears on an adaptor of a peripheral device, or on the "TIMER". If flipflop EE215 in FIG. 2 has not been placed at zero by the microprogram, any EV1 signal which appears on one of the DAI ports or on the TIMER is indicated to the MPU by signal EV1s from OR gate 220. Signal EV1s causes the interruption by the hardware of the operations in process of execution, and the hardware positions the flipflop UL217 in FIG. 2 at logical level 1 wich selects the upper register bank of the double bank of registers 210. From that moment on, all of the operations take place in the upper bank. The content of register RQSAR204 in FIG. 2 is stored in registers R14 and R15 (not represented) in the upper register bank of the double bank of registers 210. The present content of register DNR208 in FIG. 2 is stored in register ADNR209. Register DNR208 then is loaded with its new value which contains a fixed address in the controller, which is the address of the beginning of an MIOS process that takes into account the interruption of the hardware. The MIOS then reads at step 1202 the content of register DNR208 in FIG. 2, which has been loaded by the line of data CEV1 connecting coding device 221 with register DNR208. Register DNR208 then contains the number of the port having the highest priority among all of those which have sent an EV1 signal. From that number the MIOS at step 1203 goes and gets a memory address MAS1 in the control block of adaptor DACB of the peripheral device which corresponds to the selected DAI port.

Said memory address constitutes the starting address of the EV1 microprocess which must be executed on the selected peripheral device adaptor. At step 1204 in FIG. 12, the content of register SP212 in FIG. 2 is saved in a special register R7, not represented, of the bank of upper registers of the double bank 210 of registers in FIG. 2. Step 1205 in FIG. 12 performs a branch at address MSA1; if the EV1 is not a TIMER EV1, the microprocess EV1 of the AFP corresponding to the chosen device adaptor of peripheral devices is initiated, (Step 1207). This EV1 microprocess will end with the microinstruction RAI which will set flipflop UL217 back to zero and restore the content of register ADNR209 into register DNR208. RAI also will make an indirect branch toward registers 210 RE and RF of the bank of upper registers, to go and get the return address of the interrupted microprocess. In the case of a "TIMER" EV1, steps 1208 and 1209 will consist of looking to see whether there exists an MCB in the "TIMER" queue (See FIG. 2), for which the time has come to move into the Ready queue. At step 1208, the MIOS comes and reads word TQHP (See FIG. 7) which has a fixed address in memory. If the content of TQHP is empty, the MIOS passes control to step 1216 which determines whether there is a microprocess having priority in process. If the content of TQHP is not empty, then the MIOS comes and reads into the MCB indicated by the TQHP (See FIG. 11), the content of the word 6 or TOM (step 1209) (See FIG. 6). If the content of TOM is not zero, the MIOS decreases by one unit the content of TOM, and passes control to step 1216. When the content of TOM equals zero (0), this means that the time of passage of an MCB from the "TIMER" queue into the Ready queue has come, and that MCB has come out of the TQ queue and has taken its place in the Ready queue RQ, corresponding to its priority level. BIt TQ or bit 12 of the word zero of the MCB which corresponds (FIG. 6) is set at zero at step 1211, and bit RQ or bit 13 of word 0 (zero) of that MCB is placed at ONE in step 1212. Bit F or the "flag" of the word CPCW (FIG. 7) is placed at 1 (one) to indicate that a microprocess has passed into the Ready queue at step 1213. Bit T is placed at 1 at step 1214 in the YREDY BYTE of the corresponding MCB. The control of the TIMER queue is described in a French Patent Application filed on Sept. 29, 1972, under No. 72 34508, and in the corresponding U.S. application Ser. No. 400,578 entitled "Method and Apparatus for Processing Calls Distributed Randomly in Time and Requiring Response Delays of any Deviation, but Specified for Each call", filed Sept. 25, 1973 in the name of Labalme. Both of these applications are incorporated by reference.

At step 1216, the MIOS searches for a microprocess in its running state which has priority; to that end it reads from word CPCW the state of bits D, L, and M.

If D equals 1, the dispatcher was in process of execution.

If L equals 1, the interrupted microprocess is of level 2.

If M equals 1, the sequence is masked, and the microprocess temporarily is of level 2.

Therefore if D equals 1, or

L equals 1, or M equals 1, the microprocess which was interrupted has the highest priority, and it is reexecuted at step 1218. When the job which is interrupted does not have priority, step 217 consists in testing to see whether an EV2 is present.

Going back to FIG. 2, when the TIMER port is selected, the signal EV2s at the output of AND gate 223 indicates whether there exists at least one EV2 signal present on one of the DAI or PSI ports. That global test causes a gain in execution efficiency. If bit F of word CPCW is at 1, which obviously is the case when the MIOS has executed the operation, Flag equals 1 at step 1213. But the Flag does not necessarily equal 1 if the MIOS has passed directly from step 1208 or from step 1209 to step 1216.

The test on bit F also brings about an increase in the efficiency of execution (therefore in MIOS performance) since the lines of ready states will be scanned only when the priority of the job in process of execution may be questioned.

If F equals 0, the interrupted job is initiated again in step 1218.

When the dispatcher is not running (D equals 0), it is known that a job in process has been interrupted. The dispatcher can be interrupted only at certain well defined points called 'windows', to let pass the EV1 interruptions of the various DA.

When F equals 1, step 1300 is executed. It consists in entering into the "Dispatcher" and in analyzing the various lines of ready states of each level of priority.

FIG. 13 is a flow diagram of the functioning of the dispatcher. When the dispatcher is entered, bit D of the word CPCW is set at 1. Bit F of the word CPCW is set back to zero at step 1302, and at step 1303 the MIOS scans to determine whether any EV2 is waiting. If an EV2 is waiting, the register DNR208 is set back to zero, and the MIOS examines whether any EV2 corresponding to DNR equals zero: if there is no such EV2, register DNR208 is increased by 1 and therefore equals one. The MIOS again examines whether there exists another EV2 which corresponds to that DNR number; if the EV2 is not present, the content of the register DNR208 again is rasied by 1, and so forth and so on, until the value Q is reached. Q corresponds to the number attached to the PCU101. (Q equals $n + p$, $p$ being the number of PSI ports numbered from 0 to $p - 1$, and $n$ being the number of DAI ports numbered from $p$ to $p + n - 1$). If there exists an event in waiting, for a value DNR $\leq p - 1$, that event belongs to a PSI port.

The corresponding MIOS microprogram is then initiated at step 1316, and it ends with the instruction TERMINATE, the consequences of which are represented in the diagram of FIG. 17 having a starting step numbered 1700. If there exists a waiting EV2 for a value $p < $ DNR $\leq p + n - 1$, the EV2 belongs to a DAI port. The corresponding microprogram is then initiated if the bit E of the device adaptor control block DACB is not equal to 1, that is if the EV2 of the corresponding DA is not masked. If the bit E equals 1, the MIOS returns to step 1307, the content of the register DNR is raised by 1, and scanning for EV2s is started again. If bit E equals 0, the MIOS passes to step 1400 in FIG. 14. If no EV2 is present, the MIOS passes to step 1309, and looks to see whether the Ready queue at that level is empty. To that end, it looks in the table of the dispatcher corresponding to that level (See FIG. 8). If the content RQHP of the word 1 of the dispatcher table at that level points to itself, the line is empty. If the line is not empty, the MIOS takes out the MCB which is at the head of the Ready queue at that level, and it initiates the ordinary microprocess which corresponds to step 1500 (See FIG. 15). When the line is empty, the MIOS passes to step 1310 to search for a possible MCB present in the Ready queue at level 3. From level 3 to level 7 (or $2n - 1$), the MIOS operates for each level N, in the following manner. At step 1311, it tests bit B contained in word 3 of the Table of the dispatcher at level N in FIG. 8. When B equals 1, it means that the level N job has been started, but not completed; in that case the MIOS passes to step 1600 (See FIG. 16) of return to the interrupted microprocess. When B equals 0, the word RQHP of the first word of the table of the dispatcher at that level is tested. If the Ready queue (level of N) is empty, the MIOS passes to level N + 1 step 1313; if it is not empty, the ordinary microprocess which corresponds to the first MCB in the Ready queue at that level is initiated at step 1500. That process goes on up to level N equals $2^n - 1$. If the MIOS has not found an MCB on any one of the levels, (step 1314) it returns to step 1300, and the dispatcher is started again.

FIG. 14 is a flow diagram showing the initiating mechanism of an EV2 microprocess. The initiating of an EV2 microprocess begins with step 1400. From the DNR value it has calculated, (step 1307), the MIOS searches for the starting address of microprocess EV2, address MSA2, in the control block of the corresponding peripheral device adapter (word 2 of the DACB), step 1401. Then the MIOS locates the address of working field WZA2 in word 3 of the corresponding DACB and loads it into the pair of registers R4R5 (not represented) of the lower register bank of the double register bank 210 in FIG. 2 (step 1402). At step 1403, the bit L of the word CPCW is set at 1 to indicate that the job which is about to be initiated is a level 2 microprocess. At step 1404, the MIOS tests bit P of the word CPCW. If P equals 0, no microprocess was in process of execution prior to the interruption, and the MIOS passes to step 1406. If P equals 1 at step 1405, the contents of the registers of the microprocess of lower priority which was interrupted are stored in the table of the dispatcher corresponding to its level (See FIG. 8). At step 1406, but D is placed at zero; at step 1407, bit P is set at 1; and at step 1408, the level of the microprocess which is going to be in process of execution is transferred into the NCP field of the word CPCW.

At step 1409, bit B is set at 1 in the table of the dispatcher corresponding to that level to indicate that the microprocess is running. At step 1410, flipflop UL217 (FIG. 2) is set back to zero, and microprocess EV2 is initiated at step 1411.

FIG. 15 is a flow diagram which represents the steps necessary for the initiation of an ordinary microprocess of level N, starting at step 1500. At step 1501, the microprocess has come out of the Ready queue, and bit RQ of the microprocess control block MCB which corresponds to the microprocess is then set back at zero. At step 1502, the YREDY BYTE is set back to zero in the MCB, the following state of that microprocess then becomes unplanned. At step 1503, the MIOS looks at the state of bit S in the corresponding DACB. If S equals 1, the peripheral device adapter is stopped, the microprocess is killed, and the MIOS will return to step 1315, and the process in FIG. 13 starts again with step 1312. If bit S equals zero, the number of the DAI port found in the BYTE 1 of the MCB is loaded into register DNR at step 1504. If this is a microprocess of level 2, the test at step 1505 returns the MIOS to step 1411, and the process in FIG. 14 is initiated, with step 1403.

When this is not a level 2 microprocess, the MIOS returns to step 1412, and the process in FIG. 14 is started, with step 1404.

FIG. 16 is a flow diagram which represents the steps necessary for the return to an interrupted microprocess. The starting of the process is represented in step 1600. At step 1601, the MIOS tests bit P of the word CPCW. When P equals 1, the microprocess which was interrupted was interrupted by a TIMER EV1, its registers are not destroyed, and the operation directly passes to step 1603. When P equals zero, this means that the microprocess under consideration has been completed with the instruction TERMINATE; the content of the registers of the interrupted microprocess is restored from the saving field of the table of the dispatcher which corresponds to that level, and the return address is restored. At step 1603, bit D is set at zero, bit P is placed at 1, and the NCP BYTE of the word CPCW is set at the corresponding value of the microprocess which has been interrupted and which is being reinitiated. Also at step 1603, flipflop UL217 is set at zero. The return to the interrupted microprocess is achieved at step 1604 (its present state of execution again is "running").

As shown in FIG. 3, the passage of a microprocess from one state to another is taking place with the help of microinstructions. FIGS. 17 and 20 will specify those actions which are caused by those microinstructions.

FIG. 17 is a flow diagram which shows the process governed by the microinstruction TERMINATE at step 1700. The bits P, M and L of the word CPCW are placed at zero at step 1701. At step 1702, bit B is set at zero in the table of the corresponding dispatcher corresponding to the microprocess of level N which has completed its work with the instruction TERMINATE. At step 1703, the microprocess in its running state is abandoned and the MIOS performs an unconditional branch toward the first step of the the dispatcher in 1300.

Figure 18:
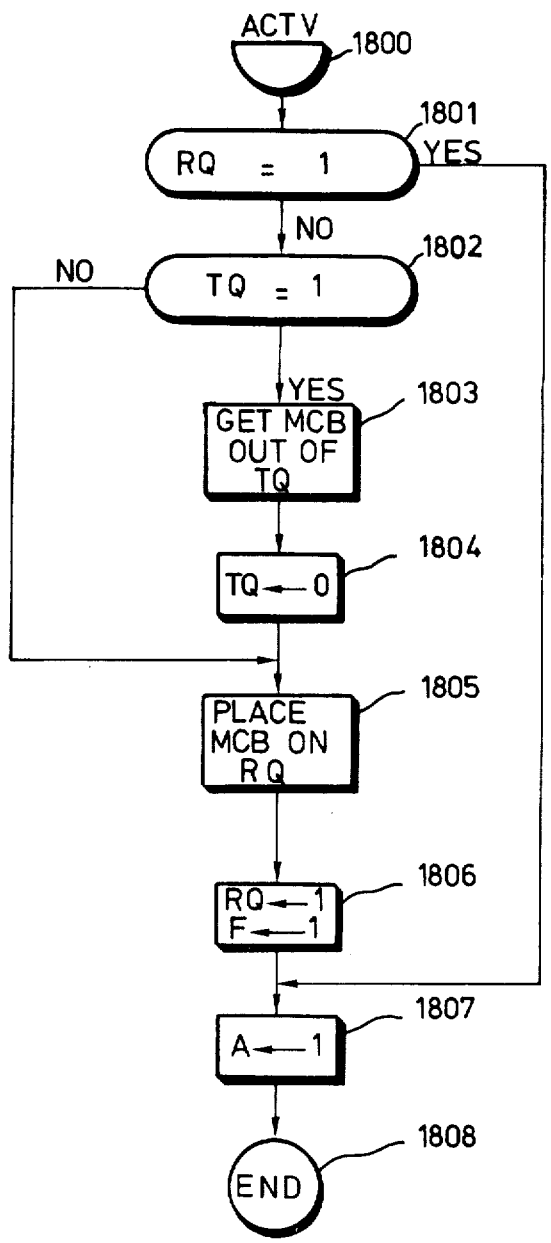
FIG. 18 is a flow diagram representing the actions which take place as a result of a microinstruction "ACTIVATE"

FIG. 18 is a flow diagram which shows the process governed by the microinstruction ACTIVATE at step 1800. Step 1801 consists in testing bit RQ. If bit RQ equals 1, the MCB already is in the Ready queue, and the MIOS then directly passes to step 1807. When RQ equals zero, the MIOS tests bit TQ. If bit TQ equals 1, the MCB has come out of the TIMER queue at step 1803, and bit TQ is reset to zero at step 1804. The MCB moves to the Ready queue at step 1805. Bits RQ and Flag are set back to 1 at step 1806. At step 1807, bit 1 of YREDY is placed at 1 to indicate that the MCB is activated. If at step 1802 TQ was equal to 0, the MCB was in no queue, and the MIOS passes to step 1805, and the MCB is placed directly into the Ready queue. Step 1808 indicates the end of the process and the return to the job in process which has generated the microinstruction ACTIVATE.

FIG. 19 represents the actions caused by a microinstruction SUSPEND at step 1900. At step 1901, the MIOS tests the state of bit TQ of the MCB. If TQ equals 1, the MCB has come out of the TIMER queue. If not, the MIOS looks to see whether the MCB is in the Ready queue at step 1902. If so, the MCB has come out of the waiting queue at step 1904. If not, it means that the MCB was not planned for, and the process stops.

FIG. 20 represents the actions caused by a microinstruction RQTO at step 2000. Step 2001 consists in testing bit RQ of the MCB. If RQ equals 1, the MCB already was in the Ready queue, and the microinstruction has no effect; in that case, and the process stops at step 2002.

If RQ equals 0, the MIOS passes to step 2003 which consists in testing the bit TQ. If TQ equals 1, the MCB is in the "TIMER" queue, and the MCB has come out of the "TIMER" queue at step 2004 for the updating of TOM in word 6. The MCB will be placed back into the TIMER queue in the order corresponding to the new value of TOM. If RQ equals 0, the MCB is placed in the TIMER queue at step 2005 and its call time is marked in the TOM field of word 6 of the MCB at step 2006. At step 2007, bit TQ is set at 1, and the actions are completed.

FIGS. 21 to 24 represent the actions caused at the time of the execution of the masking and unmasking microinstructions.

FIG. 21 represents the masking of all of the non EV1 microprocesses; to that end, bit M of the word CPCW is placed at 1 at step 2101 (the microprocess will then be considered as temporarily being of level 2, that is to say, it cannot be interrupted by another ordinary microprocess (see microprocess having highest priority, FIG. 12)).

FIG. 22 represents the corresponding unmasking. To that end, the bit M of the word CPCW is set at 0 at step 2201.

FIG. 23 represents the masking of an EV2 of the peripheral device adaptor corresponding to the AFP which has executed that microinstruction; to that end, at step 2301, bit E of the DACB, which corresponds to the content of the register DNR, is placed at 1.

FIG. 24 represents the corresponding unmasking. To that end, bit E is set at zero at step 2401.

FIG. 25 represents the actions caused by the microinstruction STDA to stop all of the operations on a peripheral device adaptor. At step 2501, bit S of the word 6 of the DACB is placed at one, to indicate that the peripheral device adaptor corresponding to it is disconnected, and that there will be no other operations on that peripheral device adaptor. At step 2502, by reading the content of the NPC field, the MIOS reads in word CPCW the level of the microprocess which was in its running state.

Steps 2503, 2504, 2505, 2506 consist in going to search for the interrupted microprocesses of level N + 1, which belong to the peripheral device adaptor, and in resetting to zero the bit B of the table of the dispatcher of level N + 1 which corresponds to that peripheral device adapter. The operation then continues for all of the other levels, up to level 7 or level $2^n - 1$. If at step 2504, N is greater than 7 or than $2^n - 1$, and if flipflop UL217 equals 1, (that is, if it is an EV1 microprocess which has requested execution), the MIOS passes to step 1219 of input into the dispatcher; if not, the MIOS passes to step 1700 and through instruction TERMINATE, if ends the microprocess which has requested execution.

It can be seen by this device that all of the microprocesses which were running, or which had been interrupted (those which had the bit B equals 1 for that peripheral device adaptor) are immediately killed; it has been seen above that the other microprocesses (those which were in the queues RQ and TQ) will be killed at the time of their initiation (See step 1503).

The above-described firmware represents only one aspect of the possible forms of execution, and it is evident that those skilled in up-to-data computer techniques would be capable of designing many other forms of execution without leaving the scope of the present invention.

GLOSSARY

FIRMWARE - Device essentially constituted by a read-only memory or fixed memory, and of its associated circuits, which serves to store microprograms for the purpose of governing repetitive functions such as the control of the peripheral devices.

HARDWARE - Encompasses all of the physical elements of the computer, whatever may be the apparatus, the organ or the device used.

BIT - Designates a binary number.

BYTE - Designates a binary number composed of several bits.

DA - An abbreviation of the term "Device Adaptor", designates an adaptor for devices.

DAI - An abbreviation of the term "Device Adaptor Interface", designates an interface of an adaptor for devices.

PSI - An abbreviation of the term "Peripheral Subsystem Interface" designates an interface between the control unit of the peripheral device and the input-output control device of the central unit.

MPU - An abbreviation of the term "Multiprocessing Peripheral Unit" or microprogrammed unit for the governing of the peripheral devices.

ICU - An abbareviation of the term "Interface Control Unit" designates an interface between the MPU and the various PSI and DAI interfaces.

ASSEMBLING - A technique which consists in regrouping together the parts of the same program or of several different programs which must be executed either together or in succession.

DISPATCHER - Microprocess distributor.

LOGICAL CHANNEL - The mode of access used to perform an input-output operation between the central processing unit and a peripheral device is called a channel. The channel is composed of a physical channel which includes the 'hardware' resources to connect the input-output controlling device of the central processing unit with the peripheral device, and of a logical channel which includes the whole complex of means necessary to perform an input-output operation. The input-output operation is defined by a channel program. The logical channel can only have one active program at one time. The numbers of the logical channels are used by the channel to drive the memorizing of the requested parameters and to maintain a number of channel programs in execution simultaneously. From the point of view of the software, the devices are identified by an input-output controller number, by a number of a physical channel and by a logical channel number. A channel program is assigned to a device. To the devices there are assigned logical channel numbers for periods of configuration of the system, or when a device is added to the system. There may be more than one logical channel per device. The logical channel may be considered as active from the time when the channel program is started by a "software" instruction until the same has been completed.

Cause d'ABORT - The immediate stopping of the operations in progress with a peripheral device may be requested by any one of the constituting elements of the system (the SW in the CPU or the FW in the CPU, or the HW or the CPU or of the PW).

What is claimed is:

1. In a data processing system comprising a central processing unit, a plurality of peripheral devices, a plurality of adaptor devices, each adaptor device associated with a respective one of said peripheral devices, and a peripheral control unit for selectively transmitting data between said central processing unit and said peripheral device, said peripheral control unit being arranged for controlling devices of channel microprocesses of at least a first class, and including means for storing said channel microprocesses, said channel microprocesses comprising said first class of microprocesses which have the properties of being automatically initiated at the start of an interrupt event and of being non-addressable by other microprocesses and are of first and second levels of priority, and a second class of microprocesses which is addressable by other microprocesses, said second class of microprocesses having varying levels of priorities, said peripheral control unit comprising:

port means responsive to said adaptor devices for identifying microprocess characteristics, including the class and priority level of the channel microprocess which is being executed by one of said adaptor devices to transfer data between one of said peripheral devices and said central processing unit;

coding means responsive to said port means for assigning priority levels to each of said first and second classes of channel microprocesses;

means responsive to said coding means and to the characteristics of said channel microprocesses for enabling the channel microprocesses of the first priority level to interrupt microprocesses of the second class;

dispatching means responsive to the priority level derived from said coding means for scanning said second class of channel microprocesses to select one of said second class of channel microprocesses having the highest level of priority, and for interrupting the channel microprocesses being run to transfer data and replacing it with the selected one microprocess if the priority level of the one selected channel microprocess is higher than the priority level of the channel microprocess being run currently; and means for completing the interrupted microprocess after the execution of the one selected channel microprocess has been terminated.

2. Apparatus, as claimed in Claim 1, wherein said storing means comprises means for storing data assigning to each channel microprocess of the second class one of the three states comprising:

a timer state indicating that the microprocess can be executed only after a predetermined time period has expired:

a ready state indicating that the microprocess is ready to be executed at any time; and an unplanned state indicating that no state is planned for the microprocess.

3. Apparatus as claimed in Claim 2, wherein said storing means comprises means for storing an indicator word having a value proportional to the predetermined time period.

4. Apparatus as claimed in Claim 3, wherein said storing means comprises storage means for data organizing the channel microprocesses in the ready state having the same priority level into a queue of microprocesses, said storing means for organizing comprising:
- means for storing a head word that identifies the microprocess at the head of the queue;
- means for storing a tail word that identifies the microprocess at the tail of the queue;
- means for storing in connection with each microprocess in the queue a following indicator which identifies the following microprocess in the queue; and
- means for storing in connection with each microprocess in the queue a preceding indicator which identifies the preceding microprocess in the queue.

5. Apparatus, as claimed in 1, wherein said storing means comprises:
- a first memory field which contains a starting address for the execution of a first microprocess of the first class having the first level of priority associated with a first event signal received from a first one of said peripheral devices;
- a second memory field which identifies a working memory field for the execution of the first microprocess;
- a third memory field which contains a starting address for the execution of a second microprocess of the first class having the second level or priority associated with a second event signal received from said first peripheral device:
- a fourth memory field which identifies a working memory field for the execution of the second microprocess;
- a fifth memory field which contains the number of a logical channel associated with said first peripheral device, as well as the maximum number of logical channels connected to the first peripheral device; and
- a sixth memory field which includes a first bit signifying that the second event signal is masked and a second bit signifying that all of the operations on said first peripheral device have been stopped.

6. Apparatus, as claimed in Claim 5, wherein the channel microprocesses of the second class are represented by $2^n - 2$ levels and wherein said port means for identifying microprocess characteristics is responsive to data stored in locations of said storing means including:
- a first location for storing an NPC word in $n$ bits which represents the priority level of the microprocess which is in the process of transferring data;
- a second location for storing an M bit indicative of a masked sequence which can temporarily place the microprocess in the process of transferring data at the second priority level;
- a third location for storing an L bit which indicates that said dispatching means is in the process of interrogating the tables of said dispatching means;
- a fourth location for storing a P bit which indicates that a microprocess is in the process of transferring data; and
- a fifth location for storing an F bit which signals that a microprocess has passed into the Ready queue of microprocesses ready to be executed.

7. Apparatus, as claimed in claim 5, and further comprising means responsive to the first event signal for reading a register containing a signal corresponding to said first peripheral device and for designating the starting address stored within said first memory field of said storing means.

8. Apparatus, as claimed in claim 7, and further comprising:
- means responsive to the first event signal for initiating the execution of the first microprocess;
- clock means for generating a periodic timer signal; means responsive to the periodic timer signal for determining that a predetermined microprocess is in the timer state, determining that the predetermined time period associated with the predetermined microprocess has expired, and placing the predetermined microprocess in the ready state.

9. Apparatus, as claimed in claim 8, and further comprising means for preventing a microprocess of the second class or a second level priority microprocess of the first class from interrupting and replacing a microprocess in the process of transferring data which has a first or second level of priority.

10. Apparatus, as claimed in claim 1, wherein said dispatching means further comprises means for executing microprocesses having a second level priority before executing a microprocess of the second class.

* * * * *

UNITED STATES PATENT OFFICE
CERTIFICATE OF CORRECTION

PATENT NO. : 4,079,448

DATED : March 14, 1978

INVENTOR(S) : Ngoc Luyen N'Guyen; Tuong Duc Luu; Jean Maurice Finet

It is certified that error appears in the above-identified patent and that said Letters Patent are hereby corrected as shown below:

Column 20, Claim 1, line 27, after "identifying" insert --channel--.

Signed and Sealed this

Twenty-second Day of August 1978

[SEAL]

Attest:

RUTH C. MASON
Attesting Officer

DONALD W. BANNER
Commissioner of Patents and Trademarks